(12) United States Patent
Stenqvist

(10) Patent No.: US 11,135,682 B2
(45) Date of Patent: Oct. 5, 2021

(54) METHOD FOR MANUFACTURING A CLAD SHEET PRODUCT

(71) Applicant: Gränges AB, Stockholm (SE)

(72) Inventor: Torkel Stenqvist, Finspång (SE)

(73) Assignee: Gränges AB, Stockholm (SE)

(*) Notice: Subject to any disclaimer, the term of this patent is extended or adjusted under 35 U.S.C. 154(b) by 136 days.

(21) Appl. No.: 16/092,625

(22) PCT Filed: Mar. 14, 2017

(86) PCT No.: PCT/EP2017/056036
§ 371 (c)(1),
(2) Date: Oct. 10, 2018

(87) PCT Pub. No.: WO2017/178181
PCT Pub. Date: Oct. 19, 2017

(65) Prior Publication Data
US 2019/0120574 A1   Apr. 25, 2019

(30) Foreign Application Priority Data

Apr. 12, 2016 (EP) ..................................... 16164815
Apr. 12, 2016 (EP) ..................................... 16164817

(51) Int. Cl.
*B23K 20/00*   (2006.01)
*B23K 35/02*   (2006.01)
(Continued)

(52) U.S. Cl.
CPC ........ *B23K 35/0238* (2013.01); *B23K 1/0012* (2013.01); *B23K 20/04* (2013.01);
(Continued)

(58) Field of Classification Search
CPC ................ B23K 35/0238; B23K 35/28; B23K 35/0222; B23K 35/0233; B23K 35/3603;
(Continued)

(56) References Cited

U.S. PATENT DOCUMENTS 3,125,805 A * 3/1964 Horigan, Jr. ......... B23K 20/227
                                                    228/199
3,466,734 A * 9/1969 Vordahl ................. B23K 20/04
                                                    228/118
(Continued)

FOREIGN PATENT DOCUMENTS

CN   1172717 A   2/1998
CN   1678421 A   10/2005
(Continued)

OTHER PUBLICATIONS

Machine translation of WO-2013/038934A1 no date available.*
(Continued)

*Primary Examiner* — Kiley S Stoner
(74) *Attorney, Agent, or Firm* — Morgan, Lewis & Bockius LLP

(57) ABSTRACT

The invention concerns a method for the manufacturing of a clad sheet product comprising a core layer (6) and at least one cladding layer, the method comprising rolling an assembly of a core layer and at least one cladding layer and reducing the thickness to a desired gauge, the core layer being made of an aluminium alloy, the at least one cladding layer comprising a centre section (2) and at least two edge sections (4, 5) positioned at opposite sides of the centre section (2) along the edges of the at least one cladding layer, the centre section being made of a material being an aluminium alloy or a composite material comprising a matrix of aluminium or an aluminium alloy, the edge sections along (4, 5) the edges being made of a material different from the material of the centre section, wherein the edge sections (4, 5) are cut off during or after the rolling. The invention further concerns a cladding plate useful in the method.

29 Claims, 3 Drawing Sheets

Figure 1:
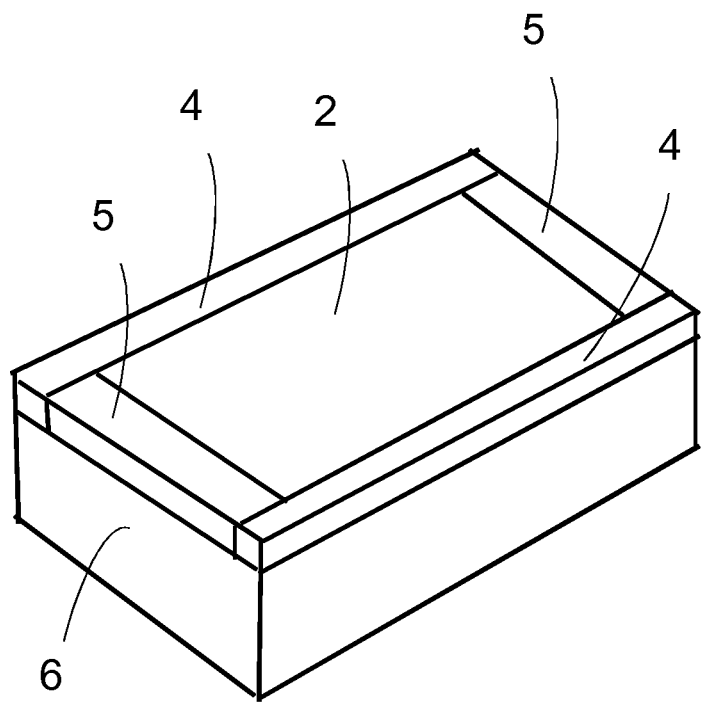

(51) Int. Cl.
| | |
|---|---|
| B23K 1/00 | (2006.01) |
| B23K 35/28 | (2006.01) |
| B23K 35/36 | (2006.01) |
| B23K 35/00 | (2006.01) |
| B32B 15/01 | (2006.01) |
| C22C 21/02 | (2006.01) |
| C22C 21/00 | (2006.01) |
| B23K 20/04 | (2006.01) |
| F28F 21/08 | (2006.01) |
| B23K 35/362 | (2006.01) |

(52) U.S. Cl.
CPC ........ *B23K 35/002* (2013.01); *B23K 35/0222* (2013.01); *B23K 35/0233* (2013.01); *B23K 35/28* (2013.01); *B23K 35/286* (2013.01); *B23K 35/362* (2013.01); *B23K 35/3603* (2013.01); *B23K 35/3605* (2013.01); *B32B 15/01* (2013.01); *B32B 15/016* (2013.01); *C22C 21/00* (2013.01); *C22C 21/02* (2013.01); *F28F 21/089* (2013.01); *F28F 2275/04* (2013.01)

(58) Field of Classification Search
CPC ............... B23K 35/362; B23K 1/0012; B23K 35/286; B23K 35/3605; B23K 35/002; B23K 20/04; B23K 2101/14; B23K 20/00; B23K 20/02; B32B 15/01; B32B 15/016; C22C 21/00; C22C 21/02; F28F 21/089; F28F 2275/04
USPC .................. 228/160, 235.2, 235.3, 183, 115
See application file for complete search history.

(56) References Cited

U.S. PATENT DOCUMENTS

| | | | | |
|---|---|---|---|---|
| 3,475,811 A * | 11/1969 | Clarke | ............... | B23K 20/04 228/159 |
| 3,514,840 A * | 6/1970 | Pitler | ............... | B23K 20/04 228/117 |
| 3,574,569 A * | 4/1971 | Vordahl | ............... | B23K 20/04 428/588 |
| 3,627,521 A * | 12/1971 | Vordahl | ............... | B22F 3/1216 419/30 |
| 4,354,301 A * | 10/1982 | Takeuchi | ............... | A44C 27/00 228/158 |
| 5,176,205 A * | 1/1993 | Anthony | ............... | B23K 35/286 165/133 |
| 6,000,886 A | 12/1999 | Washio et al. | | |
| 6,129,143 A * | 10/2000 | Hasegawa | ............... | B23K 35/286 165/133 |
| 6,251,527 B1 * | 6/2001 | Schelin | ............... | B32B 15/016 428/582 |
| 6,383,657 B1 * | 5/2002 | Weber | ............... | B32B 15/20 228/235.2 |
| 6,627,330 B1 * | 9/2003 | Shimizu | ............... | B23K 35/0238 428/654 |
| 7,373,857 B2 | 5/2008 | Dion et al. | | |
| 9,138,833 B2 | 9/2015 | Koshigoe et al. | | |
| 2002/0037426 A1 * | 3/2002 | Yamada | ............... | F28F 21/089 428/654 |
| 2002/0078566 A1 * | 6/2002 | Torigoe | ............... | F28F 19/004 29/890.03 |
| 2005/0273994 A1 * | 12/2005 | Bergstrom | ............... | B23K 20/04 29/514 |
| 2009/0214886 A1 * | 8/2009 | Ishii | ............... | B22F 7/04 428/556 |
| 2009/0283250 A1 * | 11/2009 | Beringer | ............... | B32B 15/013 165/185 |
| 2010/0101688 A1 * | 4/2010 | Koshigoe | ............... | B32B 15/016 148/535 |
| 2011/0027610 A1 * | 2/2011 | Tatsumi | ............... | C22C 21/10 428/654 |
| 2011/0108608 A1 * | 5/2011 | Kastner | ............... | B23K 20/04 228/116 |
| 2011/0192583 A1 * | 8/2011 | Sakashita | ............... | B32B 15/017 165/177 |
| 2011/0290458 A1 | 12/2011 | Gruenenwald et al. | | |
| 2012/0064367 A1 * | 3/2012 | Norman | ............... | B23K 35/286 428/654 |
| 2013/0157080 A1 * | 6/2013 | Terada | ............... | B23K 35/0238 428/654 |
| 2014/0158330 A1 * | 6/2014 | Kuroda | ............... | B32B 15/016 165/170 |
| 2015/0000783 A1 * | 1/2015 | Terada | ............... | B23K 1/0012 138/177 |
| 2016/0199948 A1 * | 7/2016 | Kamimura | ............... | B23K 35/286 428/565 |

FOREIGN PATENT DOCUMENTS

| | | | | |
|---|---|---|---|---|
| CN | 101641454 A | 2/2010 | | |
| CN | 102227287 A | 10/2011 | | |
| EP | 0552567 A1 | 7/1993 | | |
| EP | 1004390 A1 | 5/2000 | | |
| EP | 1221366 A1 | 7/2002 | | |
| EP | 1792668 A1 | 6/2007 | | |
| EP | 2272616 A1 | 1/2011 | | |
| EP | 2907615 A1 | 8/2015 | | |
| FR | 2855085 A1 | 11/2004 | | |
| JP | 55070490 A | * | 5/1980 | ............ B23K 20/04 |
| JP | 62130783 A | * | 6/1987 | ............ B23K 20/04 |
| JP | 02034297 A | * | 2/1990 | ............ B23K 35/286 |
| JP | 03008588 A | * | 1/1991 | |
| JP | H03-142079 A | | 6/1991 | |
| JP | 04111981 A | * | 4/1992 | |
| JP | H06-315791 A | | 11/1994 | |
| JP | 2000-117319 A | | 4/2000 | |
| JP | 2003-170279 A | | 6/2003 | |
| JP | 2009-090330 A | | 4/2009 | |
| JP | 2012-179656 A | | 9/2012 | |
| JP | WO-2013/038934 A1 | * | 3/2013 | |
| JP | 2013-059773 A | | 4/2013 | |
| JP | 2013-059774 A | | 4/2013 | |
| WO | 2008/110808 A1 | | 9/2008 | |
| WO | 2013/038934 A1 | | 3/2013 | |
| WO | WO-2017081042 A1 | * | 5/2017 | ............ B23K 35/288 |

OTHER PUBLICATIONS

Translation of First Office Action dated Mar. 30, 2020, issued in Chinese Application No. 201780023281.4.

International Search Report and Written Opinion dated May 23, 2017, issued in corresponding International Application No. PCT/EP2017/056036.

International Preliminary Report on Patentability dated May 17, 2018, issued in corresponding International Application No. PCT/EP2017/056036.

Office Action dated Nov. 30, 2020, issued in Japanese Application No. 2018-553352.

* cited by examiner

METHOD FOR MANUFACTURING A CLAD SHEET PRODUCT

The present invention relates to a method for the manufacturing of a clad sheet product and a cladding plate useful in the method.

Aluminium alloy clad sheet products are useful for many applications, such as Alclad sheets for aerospace applications, automotive body sheets and building elements for façades and roofing. One important kind of clad sheet products are brazing sheets can be used for the manufacturing of brazed products, such as brazed heat exchangers like radiators, condensers, evaporators etc. that commonly are used in automotive engine cooling or air conditioning systems, as well as in industrial heat exchange systems. A common type of heat exchanger includes a number of parallel tubes (welded/folded/multi chamber etc.) with each tube joined typically at either end to headers and corrugated fins separating any two adjacent tubes. Other kinds include plate heat exchangers and plate and bar heat exchangers.

Aluminium alloy clad sheet products, such as brazing sheets, usually comprise a core made of an aluminium alloy and one or more cladding layers of other aluminium alloys. The clad sheets are produced by rolling to join the different layers and reduce the gauge to fit the intended use. After rolling, a portion close to the edges in the rolling direction is usually of inadequate quality (e.g. due to cracking, too thin or too thick cladding, etc.) and has to be cut off. Usually also portions at the head and tail have to be cut off for the same reason. Sometimes it is also necessary to cut off more material due to the desired width of the final sliced coils delivered to the end user. The scrap obtained is remelted and recirculated to the production. However, if the cladding layers are made of alloys with very high amounts of alloying elements, such as Si in braze claddings and Zn in sacrificial claddings, the possible use of the scrap is more limited. The problem is even more significant if the cladding is made of flux containing material as disclosed in WO2008/110808 A1, EP552567 A1 or FR2855085 A1, in which case the scrap is complicated to recycle.

WO2013038934 A1 and JP2013-059773 A disclose an aluminium alloy brazing sheet and a method for its production. The aluminium alloy brazing sheet is formed by cladding one surface or both surfaces of a core material with an Al—Si aluminium alloy brazing filler metal containing 6-13% Si. A mixture of a fluoride-based flux and small amounts of a metal powder having a solidus temperature lower than an Al—Si brazing material is included in an interface between the core material and the brazing filler metal. The layer of a mixture of flux and metal powder is surrounded by an aluminium frame preventing escape of the mixture.

EP1221366 A1 and U.S. Pat. No. 6,251,527 B1 disclose the application of a liner material which is corrosion resistant to a strong and tough core aluminium alloy which has been grooved out creating a liner bed resulting in an Alclad structure. The method is said to avoid formation of excess liner material along the edges, but it is necessary to remove extensive amounts of material to create the liner bed.

It is an object of the invention to provide a method for the manufacturing of a clad sheet product, particularly a brazing sheet, enabling control of the composition of the scrap obtained.

It is a further object of the invention to provide a cladding plate that can be used in the method of the invention.

One aspect of the invention concerns a method for the manufacturing of a clad sheet product, preferably a brazing sheet, said clad sheet product comprising a core layer and at least one cladding layer as defined in the claims. More specifically, the method comprises rolling an assembly of a core layer and at least one cladding layer and reducing the thickness to a desired gauge, the core layer being made of an aluminium alloy, the at least one cladding layer comprising a centre section and at least two preferably parallel edge sections positioned at opposite sides of the centre section along the edges of the at least one cladding layer, the centre section being made of a material being an aluminium alloy or a composite material comprising a matrix of aluminium or an aluminium alloy, the edge sections along the edges being made of a material different from the material of the centre section, wherein the edge sections are cut off during or after the rolling.

A further aspect of the invention concerns a cladding plate as defined in the claims. More specifically, the cladding plate comprises at least one cladding layer comprising a centre section and at least two preferably parallel edge sections at opposite sides of the centre section along the edges of the cladding plate, the centre section being made of a material being an aluminium alloy or a composite material comprising a matrix of aluminium or an aluminium alloy, the edge sections along the edges being made of a material different from the material of the centre section.

For any description of alloy compositions or preferred alloy compositions, all references to percentages are by weight percent (wt %) unless otherwise indicated.

The term "sheet" as used herein also include flat rolled material with thicknesses ranging from thin foil to thick plate.

The term "edge section" as used herein refers both to edge sections extending along the edges in the rolling direction, hereinafter also referred to as "side sections", and to edge sections extending along the edges cross the rolling direction (forming the head and tail of the strip obtained after rolling), hereinafter also referred to as "head and tail sections".

The term "filler alloy" as used herein refers to an aluminium alloy having a liquidus temperature that is lower than the solidus temperature of the core layer and the purpose of said filler alloy is to melt a form a joint with a counter surface.

According to the invention the at least one cladding layer comprises edge sections that are side sections extending along the edges in the rolling direction and/or edge sections that are head and tail sections extending along the edges cross the rolling direction. The at least one cladding layer may comprise only side sections extending along the rolling direction, or only head and tail sections extending cross the rolling directions, or both side sections and head and tail sections so the edge sections surround the centre section. Preferably the at least one cladding layer comprises at least side sections extending along the edges in the rolling direction.

In the method of the invention, the core layer may be cladded on only one side or on both sides, depending on the intended use of the clad sheet product. Furthermore, both sides of the core layer can be cladded with the same kind of cladding, such as a braze cladding, or the two sides can be cladded with different kinds of claddings, such as a braze cladding on one side and a sacrificial cladding having a lower corrosion potential than the core layer on the other side thereof. It is also possible to include one or more interlayers between the core and the outer cladding layers. If there is more than one cladding layer, at least one of them is provided with a centre section and edge sections of a material different from the material of the centre section, while the other cladding layers may or may not be provided with such centre and edge sections.

The method of the invention comprises rolling an assembly of the layers. The rolling preferably comprises hot rolling, preferably at a temperature from 350 to 500° C. The thickness reduction at hot rolling is preferably from 90 to 99.5%. The hot rolling is preferably followed by cold rolling to the desired final gauge in one or several stages, optionally with intermediate annealing. The total thickness reduction in the cold rolling is preferably from 25 to 99% or from 50 to 99%. The final gauge depends on the intended use, but is in most cases preferably from 50 to 3000 µm, most preferably from 100 to 2000 µm. The core layer preferably constitutes from 50 to 98%, most preferably from 70 to 90% of the total gauge. The cold rolling is optionally followed by annealing to the desired temper for the delivery conditions. Suitable temper depends on the intended use and may, for example, be any of O temper, H1X such as H12, H14, H16 or H18, or H2X such H24 or H26, or a T4 or T6 temper in the case of an age hardening alloy. At one or more stages during and/or after the rolling the edge sections are cut off and removed from the final product to instead form part of the unavoidable scrap obtained in the manufacturing. The total amount of material cut off is preferably at least the edge sections of a material different from the centre section, but may also be slightly more.

Before rolling, an assembly ready for rolling is preferably prepared by attaching a cladding plate forming at least one cladding layer to a core slab forming the core layer. The contact surfaces of the core slab and each layer can have any suitable geometric form, such as rectangular, square, etc. The core slab may have any suitable shape, e.g. as disclosed in EP1792668 or having uniform thickness over the entire length and/or width. The cladding plate may be only the centre section for the cladding layer, in which case the edge sections are attached separately, e.g. in the form of bars. However, the cladding plate preferably comprises both the centre section and the edge sections of at least one cladding layer attached to the core slab as an integral unit, in which case it is easier to obtain sufficient strength for the edge sections to remain in place during rolling. Such an integral unit may comprise only one cladding layer with a centre section and edge sections, or several cladding layers. If there is more than one cladding layer, at least one of them is provided with edge sections of a material different from the material of the centre section, while the other cladding layers may or may not be provided with such centre and edge sections. For example, a cladding plate may comprise two outer layers without separate centre and edge sections and one intermediate layer positioned between the outer layers, which intermediate layer comprises a centre section and edge sections as described herein. A further possibility is a cladding plate having a first layer comprising a centre section and edge sections and a second layer without separate centre and edge sections, which second layer may be intended to form the outer surface of the brazing sheet or be intended to face the core layer. Adjacent cladding layers are made of different materials, typically different aluminium alloys or composites comprising a matrix of aluminium or an aluminium alloy.

The centre section and the edge sections may be attached to the core slab by any suitable means, such as various welding methods like FSW (friction stir welding), MIG (metal inert gas welding), TIG (tungsten inert gas welding), MAG (metal active gas welding), EBW (electron beam welding, laser welding or the like, alternatively by other methods such as being held together by bands or the like of steel or any other material having sufficient strength. In case a cladding plate as an integral unit is used, the centre section and edge sections may likewise be attached to each other by any suitable means, including those recited above. A cladding plate attached to the core slab as an integral unit enables more welding joints between the centre section and the edge sections and thus higher total strength.

The invention is applicable for various kinds of cladding layers, such as filler alloy layers, sacrificial layers, composite material layers having a matrix of aluminium or an aluminium alloy and comprising a further material, such as flux particles, and combinations thereof. The invention is particularly beneficial when the centre section of a cladding is made of a composite material since scrap obtained from such a material is usually complicated to recycle, particularly in case it contains flux. Furthermore, many composite materials are complicated to produce and by the invention it is possible to lower the consumption of such material.

A filler alloy layer is preferably an aluminium alloy (referred to as filler alloy) having a liquidus temperature lower than the solidus temperature of the aluminium alloy of the core layer. The filler alloy preferably comprises Si, most preferably in an amount from 2 to 15 wt %, particularly from 4 to 14 wt % or from 6 to 13 wt %. Other elements may optionally be present in suitable amounts, such as Bi for improving the wetting, and Zn and Cu for adjusting the corrosion potential, as well as small amounts of various elements present in scrap used as raw materials and that are acceptable in certain amounts. Useful filler alloys include AA4XXX alloys such as AA4343, AA4045 and AA4047. A typical filler alloy may, for example, consist of 4-15 wt % Si, ≤0.5 wt % Bi, ≤50.25 wt % Cu, ≤0.1 wt % Mn, ≤0.2 wt % Ti, ≤0.8 wt % Fe, ≤0.05 wt % each and ≤0.2 wt % in total of unavoidable impurities, and balance Al. The exact composition is not critical as long as the filler alloy melts within the desired temperature range, preferably from 550 to 615° C. In case of more than one filler alloy layers, they may have identical or different compositions and may consequently also have different melting temperatures.

A sacrificial layer is typically of an alloy less noble than the core protecting the core from corrosion and may, for example, be intended to face the inside of a tube formed from a brazing sheet. An aluminium alloy for a sacrificial layer preferably comprise Zn, for example in an amount from 0.5 to 10 wt %, most preferably from 1.0 to 5 wt %. Useful alloys for a sacrificial layer may, for example, consist of, in wt %, 0.5-1.5 Si, ≤1.0 Mg, ≤2.0 Mn, ≤0.7 Fe, ≤0.1 Cu, ≤0.3 Cr, ≤0.3 Ti, ≤0.3 Zr, 0.5-10 Zn, ≤0.05 each and ≤0.15 in total of other elements, balance Al.

A composite material layer comprises a matrix of aluminium or an aluminium alloy and another material, preferably in form of particles within the matrix. Such other material may be any material serving a desired function, e.g. at brazing. The matrix of a composite material preferably constitutes from 50 to 99 wt % thereof, most preferably from 75 to 99 wt % thereof. A preferred composite material is a matrix of aluminium or an aluminium alloy comprising flux particles, enabling production of a self-fluxing brazing sheet. The matrix of a composite layer can be essentially pure aluminium with only small amounts of impurities of other elements, typically below 0.10 wt % or below 0.05 wt %, or an aluminium alloy that, for example, may be any AA1XXX, AA2XXX, AA3XXX, AA4XXX, AA7XXXX or AA8XXX aluminium alloy. In case the material comprises flux it is preferred that the amount of Mg in the matrix of such a flux composite layer is limited, preferably ≤0.4 wt %, more preferably ≤0.3 wt %, most preferably ≤0.2 wt %, particularly 50.1 wt % or 50.05 wt %. A possible aluminium alloy is a filler alloy as described above. Other possible aluminium alloys include those containing at least 99 wt % Al such as AA1050 (in wt %≤0.25 Si, ≤0.4 Fe, ≤0.05 Cu, ≤0.05 Mn, ≤0.05 Mg, ≤0.05 Zn, ≤0.05 Ti, ≤0.05 each and ≤0.15 in total of other elements, balance Al). Further possible alloys include e.g. AA3003 (in wt %≤0.6 Si, ≤0.7 Fe, 0.05-0.2 Cu, 1-1.5 Mn, ≤0.1 Zn, ≤0.05 each and ≤0.15 in total of other elements, balance Al).

Flux can be made of any substance that either directly or in the form of a reaction product thereof during brazing contributes in disrupting an oxide film on a surface to be brazed. The content of flux in a composite material layer is preferably from 1 to 20 wt %, most preferably from 1 to 15 wt %, particularly from 1 to 10 wt %. The melting point of the flux is preferably lower than the melting point of the aluminium or aluminium alloy matrix of the cladding layer. The flux is preferably present as particles in the matrix of aluminium or aluminium alloy, for example having an equivalent diameter from 1 nm up to 10 μm or up to 5 μm. Preferably the flux is insoluble in the matrix of aluminium or aluminium alloy. A suitable flux is at least one inorganic salt, preferably containing F and at least one of Li, Na, K, Rb, Cs, Fr, Cs, Al, Zn or Sn, particularly at least one of K, Li, Cs, Na or Al. Examples of such salts include one or more of potassium fluoro aluminate like potassium tetra-, penta-, and hexa-fluoroaluminates ($KAlF_4$, $K_2AlF_5 \cdot H_2O$, $K_3AlF_6$ etc.), and the aforementioned salts that may also contain hydroxyfluoro- or oxyfluoroalumium species ($AlF_2O \cdot H_2O$, $Al_2F_4O$, $AlF(OH)_2$, AlFO etc.). Other possible salts include one or more of sodium fluoroaluminates ($Na_3AlF_6$), cesium aluminium fluorides ($CsAlF_4$, $Cs_2AlF_5$ etc.), potassium silicofluorides ($K_2SiF_6$, $K_3SiF_7$ etc.), alkali zinc fluorides ($KZnF_3$ etc.) and potassium tin fluoride salts ($KSnF_3$, $KSnF_5$, $K_2SnF_6$ and $K_3SnF_7$ etc.). Further possible salts include $AlF_3$, NaF, KF, LiF, $K_{1-3}AlF_{4-6}$, $Cs_{1-3}AlF_{4-6}$, $Li_3AlF_6$, and $CsxAlyF_2$. Any of the above salts can be used alone or in mixtures. Also hydrates of all the above mentioned salts can be used.

In an embodiment of the invention a composite material layer comprising flux particles and at least one layer of a filler alloy are attached to each other. The composite material layer may then be intended to face the outer surface of a brazing sheet or face the core layer. Preferably a composite material layer comprising flux particles is positioned between two layers of filler alloy. At least the composite material layer comprises a centre section and edge sections. The layer or layers of filler alloy may or may not comprise edge sections of a material different from the material of the respective centre section.

The edge sections for a layer are made of a material different from the material of the centre section. Preferably the material is aluminium or an aluminium alloy. In case the centre section is made of an aluminium alloy, the edge sections are made of aluminium or an aluminium alloy different from the aluminium alloy of the centre section. In case the centre sections is made of a composite material comprising a matrix of aluminium or an aluminium alloy, the edge sections can be made of the same material as the matrix of the composite material or a different material. By selecting an appropriate material for the edge sections it is possible to control the composition of the scrap obtained in the production of the clad sheet product such as a brazing sheet. The material for the edge sections may, for example, be the same as used in the core layer, but may alternatively be a different material. In case there are both side sections and head and tail sections, they may all be of the same material or of different materials.

Before rolling each side section extending along the edges in the rolling direction preferably constitute from 1 to 20% or from 2 to 20%, most preferably from 3 to 20% or from 3 to 10% of the total width of the cladding layer. Before rolling each head and tails section extending along the edges cross the rolling direction preferably constitute from 3 to 20%, most preferably from 4 to 10% of the total length of the cladding layer. The minimum width and length is determined by how large portion that otherwise would have been of inferior quality, which, e.g. may depend on the materials in the different layers. It can also be motivated to use larger portions for the side sections so the full width of the centre section corresponds to a certain number of slit coils of desired size that can be obtained from the mother coil in each individual case. It is to be understood that the dimensions before rolling are applicable also to a cladding plate as such that comprises both a centre section and edge sections as an integral unit. It is also to be understood that before rolling one or more of the cladding layers, e.g. all cladding layers, do not need to exactly cover the core slab, but may be larger or smaller in one or both the dimensions, i.e. along the rolling direction and/or cross the rolling direction. The above is applicable also for a cladding plate.

Preparation of a cladding plate of the invention preferably comprises attaching the edge sections to the centre section of at least one cladding layer by any suitable means, such as by FSW or any of the earlier mentioned welding methods. If the cladding plate comprises more than one cladding layer, the layers are preferably attached to each other by any of the earlier described methods for attaching any of the layers to the core slab.

Cladding layers for a cladding plate can be manufactured by any suitable method, for example DC casting followed by rolling to the desired thickness. A composite material layer may be prepared from a composite billet or slab obtained by spray forming or by subjecting powder of aluminium or an aluminium alloy and particles of the other material to high pressure, e.g. as described in the earlier mentioned WO2008/110808 A1, EP552567 A1 or FR2855085 A1. Other possible methods are thermal spraying such as flame spraying or plasma spraying, or additive manufacturing technology such as 3D metal printing. The billet or slab or a part thereof may then be extruded and/or rolled and optionally cut to the desired size. The edge sections can be prepared by any suitable method, such as extrusion, forging, rolling, or the like, if necessary followed by cutting into appropriate size.

The thickness of a cladding plate depends on how many cladding layers it comprises, the kind of cladding layers and the thickness of the core slab. In most cases the total thickness of a cladding plate when attached to the core slab is preferably from 5 to 250 mm, most preferably from 10 to 150 mm. The thickness of the individual cladding layers depends on their function. For example, the thickness of a filler alloy layer in a cladding plate, or filler alloy layers in total if more than one, is preferably from 2 to 20% most preferably from 5 to 15% of the thickness of the core slab. A sacrificial layer in a cladding plate is preferably from 2 to 25% most preferably from 4 to 20% of the thickness of the core slab. A composite material layer comprising flux in a cladding plate also comprising separate filler alloy layers is preferably from 5 to 80%, most preferably from 10 to 50% of the thickness of the filler alloy layer or layers in total at the same side of the core slab.

A core slab can be prepared by any suitable method, such as direct chill (DC) casting. The core slab, and thus also the resulting core layer, can be made of any suitable aluminium alloy, particularly an AA3XXX or an AA6XXX aluminium alloy. Examples of alloys include those consisting of, in wt %, ≤2 Si, ≤2 Fe, ≤3 Cu, ≤2 Mn, ≤1 Mg, ≤50.5 each of one or more of Ti, Zr, Cr, V and Sn, balance aluminium and ≤0.05 each and ≤0.15 in total of unavoidable impurities.

The thickness of a core slab (before rolling) depends on the hot mill gap and may, for example be from 100 to 1500 mm or from 200 to 1000 mm.

The invention enables a simple method of reducing the amount of low value scrap obtained in the production of clad sheet products such as brazing sheets. In case the material for a cladding layer is complicated to produce, like many composite materials, the invention also provides for less consumption of such material.

FIGS. 1-6 schematically show various embodiments of the invention.

FIG. 1 shows an assembly before rolling that comprises a core slab 6 and a single cladding layer. The cladding layer is attached to the core slab 6 and includes a centre section 2, side sections 4 along the edges in the rolling direction and head and tail sections 5 along the edges cross the rolling direction. The side sections 4 extend over the entire length of the assembly while the head and tail sections 5 only extend over the width of the centre section 2. The edge sections, i.e. the side sections 4 and the head and tail sections 5, can be made of the same or of different materials as long as it is different from the material of the centre section 2. The centre section 2 and the edge sections 4, 5, is preferably an integral cladding plate but may alternatively be separate pieces that have been attached to the core slab 6. At rolling, the gauge will be reduced and the length of the assembly will correspondingly be extended to obtain a long strip. The width of the side sections 4 along the rolling direction will remain essentially the same (although minor widening usually occurs), while the head and tail sections 5 will be substantially extended. At one or several stages during or after the rolling the edge sections 4, 5 are cut off and removed as scrap that subsequently can be remelted and recirculated to the production. The remaining part is normally slit into strips of a width suitable for the intended use. The embodiment shown is applicable for any kind of cladding layers, for example when the centre section 2 is made of a composite material of a matrix of a filler alloy as earlier described comprising flux particles. Although FIG. 1 only shows a cladding layer at one side of the core slab 6, it is to be understood that the same or similar kind of cladding layer may be applied at both sides of the core slab 6.

Figure 2:
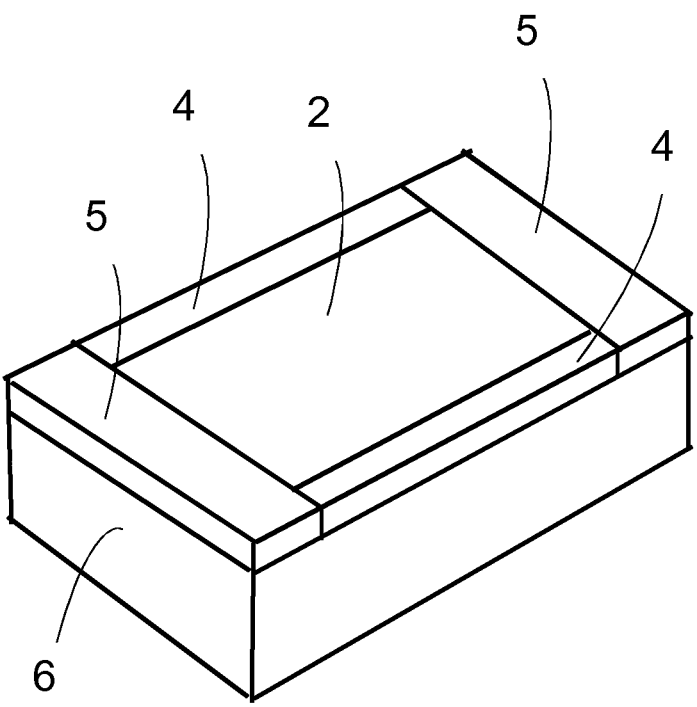

FIG. 2 shows an embodiment similar to the one of FIG. 1, with the exception that the head and tail sections 5 extend over the entire width of the assembly while the side sections 4 only extend over the length of the centre section 2. In all other aspects the embodiment of FIG. 2 is identical to the one of FIG. 1.

Figure 3:
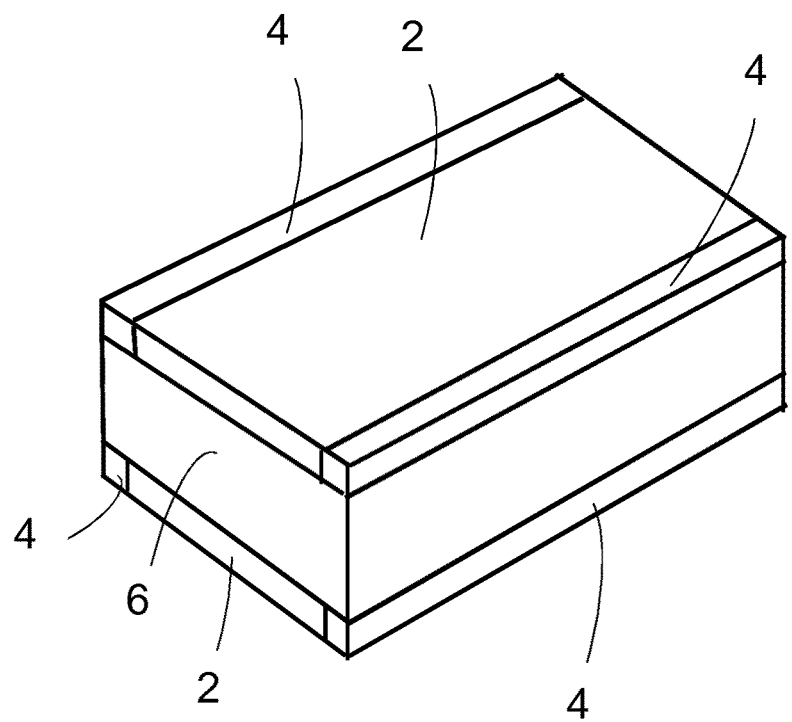

FIG. 3 shows an embodiment similar to the one in FIG. 1 but with cladding layers on both sides of the core slab. Further, each the cladding layer comprise a centre section 2 and side sections 4 extending along the edges in the rolling direction, but no separate head and tail sections, of a material different from the material of the centre section 2. In all other aspects the embodiment of FIG. 3 is identical to the one of FIG. 1.

Figure 4:
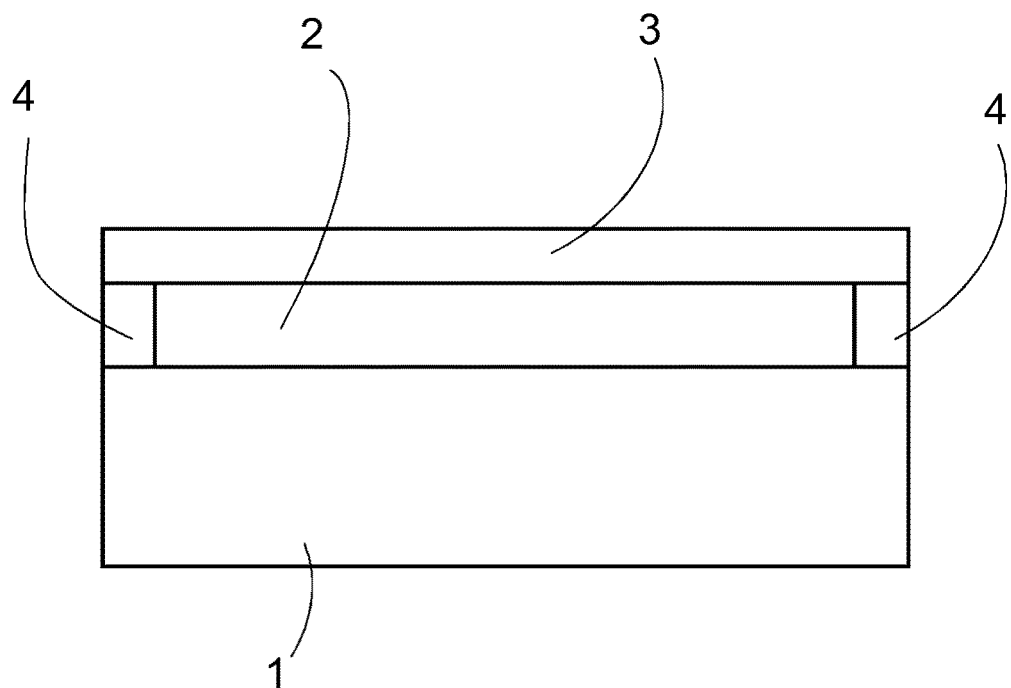

FIG. 4 shows a cross section of a cladding plate according to an embodiment with three cladding layers. Only the cladding layer in the middle is provided with a centre section 2 and side sections 4 along the edges in the intended rolling direction of a material different from the centre section 2, while the two cladding layers 1, 3 arranged on each side thereof do not have separate centre and edge sections of different materials. The cladding layer in the middle may or may not have separate head and tail sections. The embodiment shown is, for example, applicable when the centre section 2 of the cladding layer in the middle is a composite material of a matrix of aluminium or an aluminium alloy (filler alloy or any other kind of aluminium alloy) comprising flux particles, while the other cladding layers 1, 3 are of a filler alloy. The filler alloy of the different layers may be identical or different filler alloys. The thickest cladding layer 3 is intended to face the core layer (not shown). A cladding plate as shown can be applied at only one side or at both side of a core slab (not shown).

Figure 5:
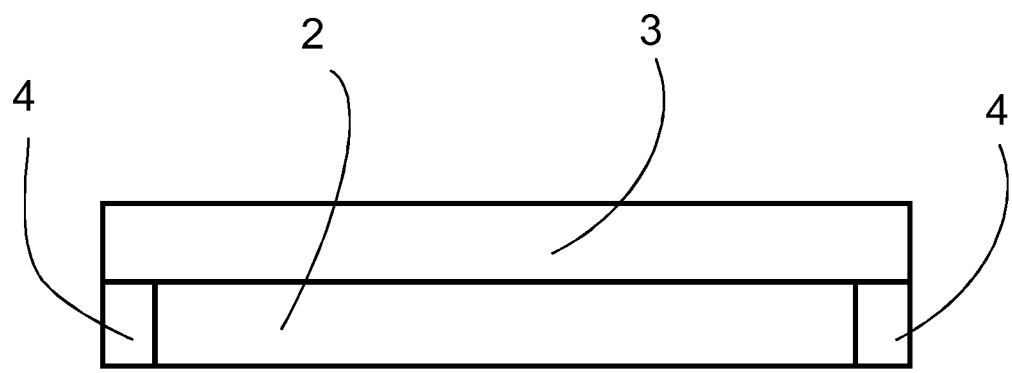

FIG. 5 shows a cross section of a cladding plate with only two layers, one of which being provided with a centre section 2 and side sections 4 along the edges in the intended rolling direction of a material different from the centre section 2, while the other layer 3 does not have any separate edge sections. The embodiment shown is, for example, applicable when the centre section 2 is a composite material of a matrix of aluminium or an aluminium alloy (filler alloy or any other kind of aluminium alloy) comprising flux particles, while the other cladding layer 3 is of a filler alloy. A cladding plate as shown can be applied at only one side or at both side of a core slab (not shown). It can also be applied with any of the cladding layers facing the core slab.

Figure 6:
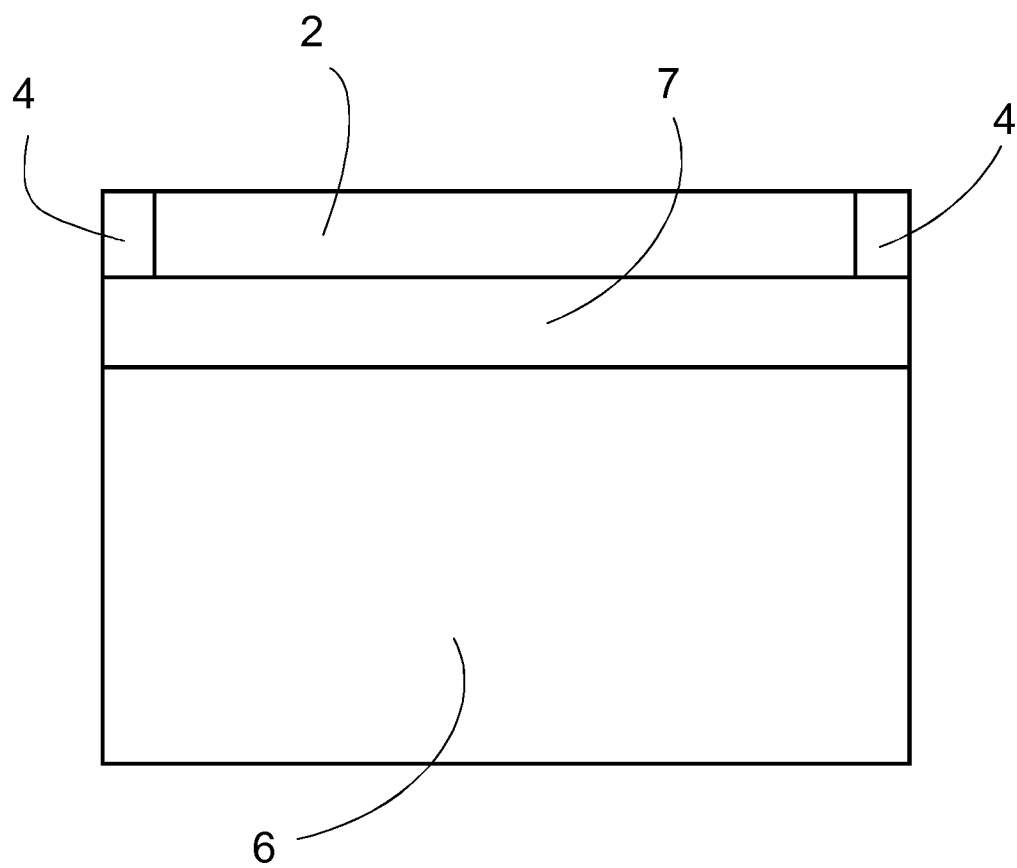

FIG. 6 shows a cross section of an assembly before rolling that comprises of a core slab 6, an outer cladding layer and an intermediate cladding layer 7. The outer cladding layer includes a centre section 2 and side sections 4 along the edges in the rolling direction. The embodiment shown is applicable for any kind of cladding layers. For example, the centre section 2 may be made of a filler alloy or of a composite material of a matrix of a filler alloy comprising flux particles. The intermediate layer 7 may be of any suitable aluminium alloy, for example for inhibiting migration of Si from the filler alloy in the outer cladding layer into the core 6 during brazing or for serving as a sacrificial layer. The outer and intermediate cladding layers may be attached to the core slab as separate cladding plates or as a preprepared two layered cladding plate. Although FIG. 5 only shows cladding layers at one side of the core slab 6, it is to be understood that the same or similar kind of cladding layer may be applied at both sides of the core slab 6.

The invention is further described in connection with the following Examples, which, however, is not intended to limit the scope of the invention.

EXAMPLE 1

Cladding plates comprising of a centre section and two parallel side sections extending along the intended rolling direction were prepared by attaching two 3.9 m×70 mm×25 mm AA3003 bars for the side sections to a 3.9 m×0.9 m×25 mm plate for the centre by friction stir welding. The plate for the centre section was made of flux composite material of an aluminium alloy matrix containing approximately 4-5 wt % flux particles prepared by spray forming a billet according to WO2008/110808 followed by extrusion and friction stir welding. The aluminium alloy matrix in the flux composite material was a filler alloy AA4045 (Al with 10 wt % Si) and the flux was $AlKF_4$.

The cladding plates were attached by welding on both sides of a 4.1 m×1.05 m×355 mm DC cast core slab to form an assembly as shown in FIG. 3. The core slab was made of an aluminium alloy consisting of, in wt %, ≤0.5 Si, ≤0.5 Fe, 0.25-0.50 Cu, 1.0-2.0 Mn, ≤0.03 Mg, ≤0.10 Zn, 0.08-0.25 Ti, other elements≤0.05 each and ≤0.15 in total, balance Al. The contact surfaces were milled.

The assembly was hot rolled at about 450° C. to a gauge of 3.7 mm and then cold rolled to obtain a clad strip having a final gauge of 0.485 mm. During the cold rolling process totally 40 mm at each side along the rolling direction was cut off, thus no material from the centre section was included in the scrap obtained. Finally, the coil was slit into several rings and in total only 33 mm from each side of the composite material was scrapped. Inspection of the final strip obtained in the rolling revealed that the cladding thickness was essentially uniform across the entire width cross the rolling direction.

EXAMPLE 2

Cladding plates were prepared as in Example 1 with the exceptions that the bars for the side sections were made of AA6063 and had the dimensions 3.9 m×120 mm×25 mm, and that the centre section had the dimension 3.9 m×1.191 m×25 mm.

The cladding plates were welded on both sides of a core slab as in Example 1 with the exception that the size of the core slab was to 4.1 m×1.44 m×355 mm.

The materials of the core slab and the centre section of the cladding plates were the same as in Example 1.

The assembly was hot rolled at about 465° C. to a gauge of 3.7 mm and then cold rolled to obtain a clad strip having a final gauge of 0.485 mm. During the cold rolling process totally 20 mm at each side along the rolling direction was cut off, thus no material from the centre section was included in the scrap obtained. Finally, the coil was slit into several rings utilising 1112 mm, thus in total only 39.5 mm from each side of the composite material was scrapped.

Inspection of the final strip obtained in in the rolling revealed that the cladding thickness was essentially uniform across the entire width cross the rolling direction.

The invention claimed is:

1. A method for the manufacturing of a clad sheet product comprising a core layer and at least one cladding layer, the method comprising:
preparing an assembly of a core layer and at least one cladding layer by attaching a cladding plate as an integral unit forming the at least one cladding layer to a core slab forming the core layer, the at least one cladding layer of the cladding plate comprising both a centre section and at least two edge sections positioned at opposite sides of the centre section along edges of the at least one cladding layer; and
rolling the assembly and reducing the thickness to a desired gauge, the core layer being made of a first aluminium alloy, the centre section of the at least one cladding being made of a material being a second aluminium alloy or a composite material comprising a matrix of aluminium or a third aluminium alloy, the edge sections along the edges being made of aluminium or a fourth aluminium alloy that is different from the material of the centre section,
wherein the material of the centre section of the at least one cladding layer (i) has a liquidus temperature lower than a solidus temperature of the first aluminum alloy of the core layer or (ii) is less noble than the first aluminum alloy of the core layer or (iii) includes flux particles, and
wherein the edge sections are cut off during or after the rolling.

2. Method as claimed in claim 1, wherein the at least one cladding layer comprises edge sections that are side sections extending along the edges in the rolling direction.

3. Method as claimed in claim 1, wherein the at least one cladding layer comprises edge sections that are head and tail sections extending along the edges cross the rolling direction.

4. Method as claimed in claim 1, wherein the at least one cladding layer comprises both side sections extending along the edges in the rolling direction and head and tail sections extending along the edges cross the rolling direction.

5. A cladding plate for manufacturing of a clad sheet product according to the method of claim 1, said cladding plate being an integral unit and comprising:
the at least one cladding layer comprising the centre section and the at least two edge sections at opposite sides of the centre section along the edges of the cladding plate, the centre section being made of a material being the second aluminium alloy or the composite material comprising the matrix of aluminium or the third aluminium alloy, and the edge sections along the edges being made of aluminium or the fourth aluminium alloy that is different from the material of the centre section.

6. Cladding plate as claimed in claim 5, wherein the at least one cladding layer comprises edge sections that are side sections along the edges in the intended rolling direction.

7. Cladding plate as claimed in claim 5, wherein the at least one cladding layer comprises edge sections that are head and tail sections extending along the edges cross the intended rolling direction.

8. Cladding plate as claimed in claim 6, wherein each side section along the edges in the intended rolling direction constitute from 1 to 20% of the total width of the cladding layer.

9. Cladding plate as claimed in claim 7, wherein each head and tail section extending along the edges cross the rolling direction constitute from 3 to 20% of the total length of the cladding layer.

10. Cladding plate as claimed in claim 5, comprising only one cladding layer.

11. Cladding plate as claimed in claim 5, comprising more than one cladding layer, at least one of the more than one cladding layer being provided with edge sections of a material different from the material of the centre section.

12. Cladding plate as claimed in claim 5, wherein the material of the centre section is made of the composite material comprising the matrix of aluminium or the third aluminium alloy and the composite material further comprises flux particles.

13. Method as claimed in claim 2, wherein each side section constitutes from 1 to 20% of the total width of the cladding layer.

14. Method as claimed in claim 3, wherein each head and tail section constitutes from 3 to 20% of the total length of the cladding layer.

15. Method as claimed in claim 4, wherein each side section constitutes from 1 to 20% of the total width of the cladding layer and each head and tail section constitutes from 3 to 20% of the total length of the cladding layer.

16. Method as claimed in claim 1, wherein the cladding plate comprises only one cladding layer.

17. Method as claimed in claim 1, wherein the centre section of the at least one cladding layer is the composite material comprising the matrix of aluminium or the third aluminium alloy and the composite material further comprises flux particles.

18. A method for the manufacturing of a clad sheet product, the method comprising:
attaching at least two edge sections to opposite sides of a centre section to form a cladding plate, wherein the cladding plate is an integral unit,
attaching at least one cladding plate to a first surface of a core slab to form an assembly, wherein the core slab forms a core layer of the assembly and the at least one cladding plate forms a cladding layer of the assembly and wherein the at least two edge sections of the at least one cladding plate are along edges of the cladding layer; and
rolling the assembly and reducing a thickness of the assembly to a desired gauge,
wherein a material of the core layer is a first aluminium alloy, a material of the centre section is made of a second aluminium alloy or a composite material comprising a matrix of aluminium or a third aluminium alloy, and a material of the at least two edge sections is aluminium or a fourth aluminium alloy different from the aluminium or the fourth aluminium alloy in the material of the centre section,
wherein the material of the centre section of the at least one cladding layer (i) has a liquidus temperature lower than a solidus temperature of the first aluminum alloy of the core layer or (ii) is less noble than the first aluminum alloy of the core layer or (iii) includes flux particles, and
wherein the at least two edge sections of the at least one cladding plate are cut off during or after the rolling.

19. The method as claimed in claim 18, wherein, prior to rolling, the method further comprises attaching a second cladding plate to a second surface of the core slab,
wherein the second surface of the core slab is opposite the first surface of the core slab, and
wherein the second cladding plate forms a second cladding layer of the assembly.

20. The method as claimed in claim 19, wherein the at least two edge sections of the second cladding plate are along edges of the cladding layer and wherein the at least two edge sections of the second cladding plate are cut off during or after the rolling.

21. A method for the manufacturing of a clad sheet product comprising a core layer and at least one cladding layer, the method comprising:
preparing an assembly of a core layer and at least one cladding layer by attaching a cladding plate as an integral unit forming at least one cladding layer to a core slab forming the core layer, said cladding plate comprising more than one cladding layer and at least one of the cladding layers of the cladding plate comprising both the centre section and at least two edge sections positioned at opposite sides of the centre section along the edges of the at least one cladding layer; and
rolling the assembly and reducing the thickness to a desired gauge, the core layer being made of a first aluminium alloy, the centre section of the at least one cladding layer being made of a material being a second aluminium alloy or a composite material comprising a matrix of aluminium or a third aluminium alloy, the edge sections along the edges being made of aluminium or a fourth aluminium alloy different from the material of the centre section,
wherein the material of the centre section of the at least one cladding layer (i) has a liquidus temperature lower than a solidus temperature of the first aluminum alloy of the core layer or (ii) is less noble than the first aluminum alloy of the core layer or (iii) includes flux particles, and
wherein the edge sections are cut off during or after the rolling.

22. The method as claimed in claim 21, wherein the material of the centre section of the at least one cladding layer is the composite material comprising the matrix of aluminium or the third aluminium alloy, wherein the material of the centre section of the at least one cladding layer includes flux particles, and wherein a content of the flux particles is 1 to 20 wt. %.

23. The method as claimed in claim 21, wherein the first aluminium alloy, the third aluminium alloy, and the fourth aluminium alloy have the same composition.

24. The method as claimed in claim 21, wherein at least one or more of the first aluminium alloy, the second aluminium alloy, the third aluminium alloy, and the fourth aluminium alloy have different compositions.

25. The method as claimed in claim 18, wherein the material of the centre section of the at least one cladding layer is the composite material comprising the matrix of aluminium or the third aluminium alloy, wherein the material of the centre section of the at least one cladding layer includes flux particles, and wherein a content of the flux particles is 1 to 20 wt. %.

26. The method as claimed in claim 18, wherein the first aluminium alloy, the third aluminium alloy, and the fourth aluminium alloy have the same composition.

27. The method as claimed in claim 18, wherein at least one or more of the first aluminium alloy, the second aluminium alloy, the third aluminium alloy, and the fourth aluminium alloy have different compositions.

28. The method as claimed in claim 1, wherein the first aluminium alloy, the third aluminium alloy, and the fourth aluminium alloy have the same composition.

29. The method as claimed in claim 1, wherein at least one or more of the first aluminium alloy, the second aluminium alloy, the third aluminium alloy, and the fourth aluminium alloy have different compositions.

* * * * *